United States Patent
Rankin et al.

(10) Patent No.: US 7,347,087 B2
(45) Date of Patent: Mar. 25, 2008

(54) ENGINE OIL LEAK TEST SYSTEM AND METHOD

(75) Inventors: Brent C. Rankin, Lima, OH (US); Heather W. Thomas, Bellefontaine, OH (US); Chuck Hoke, Piqua, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/328,580

(22) Filed: Jan. 10, 2006

(65) Prior Publication Data

US 2007/0157714 A1 Jul. 12, 2007

(51) Int. Cl.
*G01M 15/00* (2006.01)

(52) U.S. Cl. .............................. 73/118.1; 73/49.7

(58) Field of Classification Search ............... 73/40, 73/46, 47, 49.7, 115, 116, 117.2, 117.3, 118.1, 73/119 R
See application file for complete search history.

(56) References Cited

U.S. PATENT DOCUMENTS

| | | | | |
|---|---|---|---|---|
| 3,320,801 A | * | 5/1967 | Rhindress, Jr. | 73/116 |
| 3,973,429 A | * | 8/1976 | Durgan et al. | 73/49.7 |
| 4,157,028 A | * | 6/1979 | Moffett, III | 73/49.7 |
| 4,171,636 A | * | 10/1979 | Bergeron | 73/49.7 |
| 4,213,327 A | * | 7/1980 | Prescott et al. | 73/38 |
| 4,213,328 A | * | 7/1980 | Roeschlaub et al. | 73/49.7 |
| 4,617,824 A | * | 10/1986 | Cybulski et al. | 73/49.7 |
| 5,195,362 A | * | 3/1993 | Eason | 73/49.7 |
| 5,372,031 A | * | 12/1994 | Harmand | 73/40 |
| 5,417,109 A | * | 5/1995 | Scourtes | 73/116 |
| 5,515,712 A | * | 5/1996 | Yunick | 73/9 |
| 5,585,549 A | * | 12/1996 | Brevick et al. | 73/49.7 |
| 5,633,459 A | * | 5/1997 | Rodriguez | 73/120 |
| 6,164,121 A | * | 12/2000 | Rankin | 73/37 |
| 6,298,716 B1 | * | 10/2001 | Havice | 73/116 |
| 6,499,299 B2 | * | 12/2002 | Propernick | 60/602 |
| 6,711,944 B2 | | 3/2004 | Maruta et al. | |
| 6,850,834 B1 | | 2/2005 | Yu et al. | |
| 6,854,449 B2 | | 2/2005 | Iino et al. | |
| 6,862,878 B2 | | 3/2005 | Ries-Muéller | |
| 6,901,743 B2 | | 6/2005 | Asanuma et al. | |
| 2005/0000207 A1 | | 1/2005 | Christl | |
| 2005/0109017 A1 | | 5/2005 | Wirkus et al. | |
| 2007/0151329 A1 | * | 7/2007 | Thomas et al. | 73/46 |

\* cited by examiner

*Primary Examiner*—Eric S. McCall
(74) *Attorney, Agent, or Firm*—Rankin, Hill, Porter & Clark LLP; Vincent Ciamacco (57) ABSTRACT

A system and method for testing partially assembled engines for possible oil leaks. The system includes engine pressurizing devices that are automatically controlled by a controller according to a predetermined control program based upon the engine model type being tested. The pressurizing devices introduce pressurized air into the engine oil system. A leak testing unit monitors the pressurized engine for pressure drops indicative of an oil seal leak. Air pressure leaks resulting from inherently air-porous EGR valves are compensated for by an EGR compensating unit, which provides pressurized air to an intake side of the EGR valve. The flow of pressurized air through the EGR compensating unit is monitored to determine whether there is a problem with the EGR valve.

18 Claims, 9 Drawing Sheets

ENGINE OIL LEAK TEST SYSTEM AND METHOD

CROSS-REFERENCE TO RELATED APPLICATION

The present application is related to U.S. pat. application Ser. No. 11/325,714, filed Jan. 5, 2006, the disclosure of which is expressly incorporated herein in its entirety.

BACKGROUND OF THE INVENTION

1. Field of the Invention

The present invention is generally directed toward manufacturing and testing methods and, more particularly, toward a system and method for testing an engine on a production line for oil leaks.

2. Description of Related Art

During the manufacture of an automobile engine, it is necessary to confirm that the engine's oil system does not leak. In the past, oil leak testing has been a manual operation in which an associate on the production line manually connects a flow leak tester to the engine, and the flow leak tester measures the amount of air flowing through, and out of, the oil passage. If the flow rate is greater that a predetermined limit, an alarm is sounded and the engine is sent to the repair area to be checked. Because the engine is not completely sealed during the manual leak test, some of the air flows past the piston rings, into the combustion chambers, and out the open exhaust and intake valves. The amount of air that flows past the piston rings is dependent on variables that are difficult, if not impossible, to control. For example, these variables include the amount of oil on the piston and piston rings, how long the engine has set on the production line, and the orientation of the crankshaft.

Because of these variables, the manual leak testing method requires that the alarm limits be set high to compensate for the amount of air that blows by the piston rings (hereinafter referred to as 'blow-by') and the fluctuation in the blow-by, due to the uncontrollable variables. Since many of the oil leaks are smaller than the blow-by, many small oil leaks cannot be detected by the manual leak testing method.

Therefore, there exists a need in the art for a system and method to more accurately and reliably detect oil leaks in an engine.

SUMMARY OF THE INVENTION

The present invention is directed toward a system and method for testing an engine for possible oil leaks, wherein the system is automated and wherein the method can be performed on an engine production line without interrupting the production timing or sequence.

In accordance with the present invention, the system includes a series of head seal units that are individually associated with portions of the engine. The head seal units are adapted to seal against the associated portions of the engine, and to provide a flow of pressurized air to the engine.

In further accordance with the present invention, some of the head seal units are adapted to introduce pressurized air into the engine oil system, while at least one other head seal unit is adapted to provide pressurized air to an intake side of an EGR valve and thereby offset or compensate for air leakage inherent in the EGR valve.

In further accordance with the present invention, a leak testing unit and an EGR compensation unit are provided. The leak testing unit controls pressurization of the engine, and is adapted to sense a drop in air pressure within the pressurized engine that is indicative of a possible oil seal leak. The EGR compensation unit is adapted to monitor a rate of air flow to the EGR valve, and is operable to determine whether the EGR valve is leaking air at a rate indicative of a possibly faulty EGR valve.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 6:
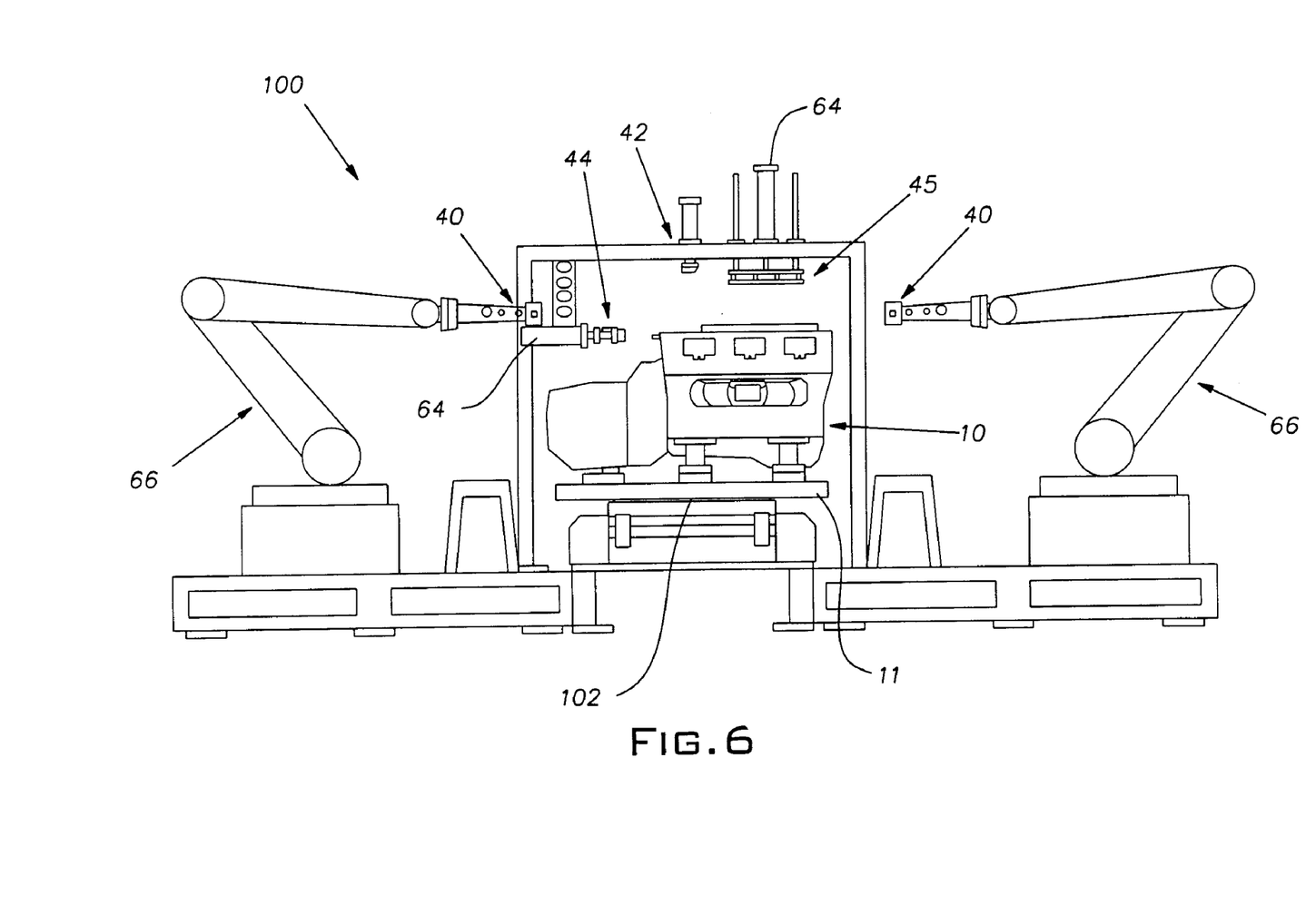
FIG. 6 schematically illustrates a leak testing station and engine prior to a leak testing procedure.
Figure 7:
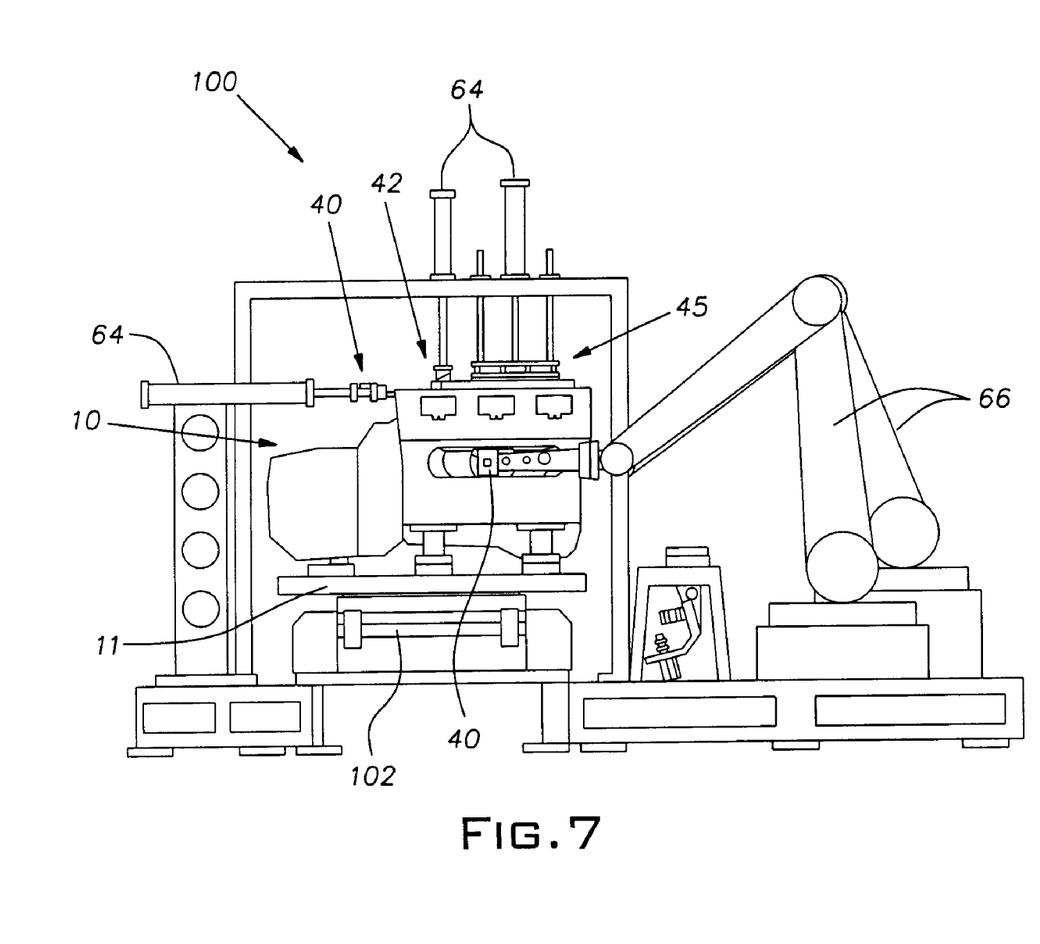
FIG. 7 schematically illustrates a similar leak testing station and engine during a leak testing procedure FIG. 8 schematically illustrates a leak testing station as in FIG. 7, but with an adaptor for accommodating an engine with an exhaust manifold outlet secured thereto; and, FIG. 9 is a flowchart showing steps of a leak testing method according to the present invention.
Figure 8:
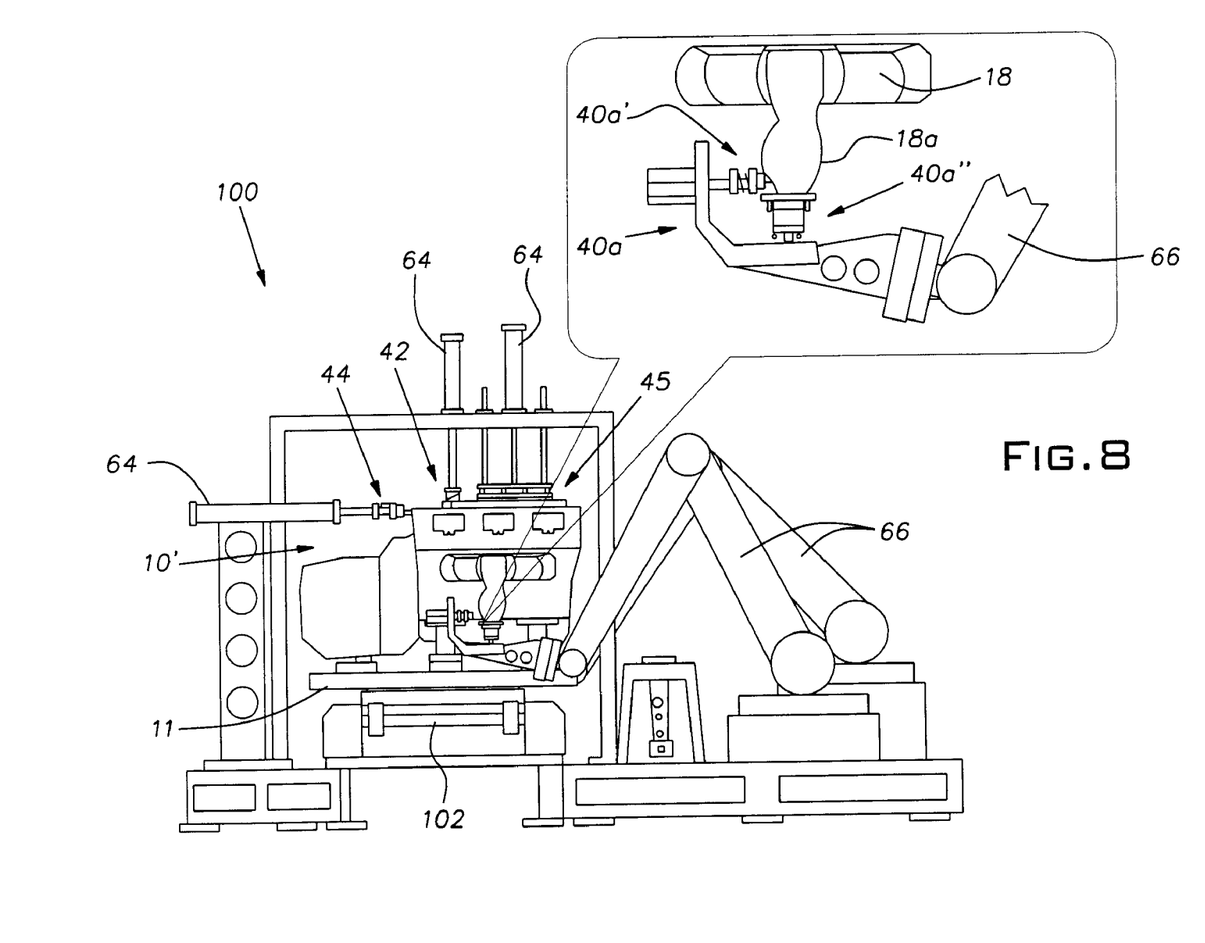

With reference to FIGS. 6-8, a portion of a production line incorporating an engine oil leak testing station 100 is schematically illustrated. The production line includes a conveyor belt 102 that extends through the testing station 100. The conveyor 102 transports partially assembled engines 10, each disposed upon a pallet 11, toward the testing station 100. The conveyor 102 also transports tested engines away from the testing station for further assembly or repair, depending upon the results of the oil leak test, as described hereinafter.

Figure 1:
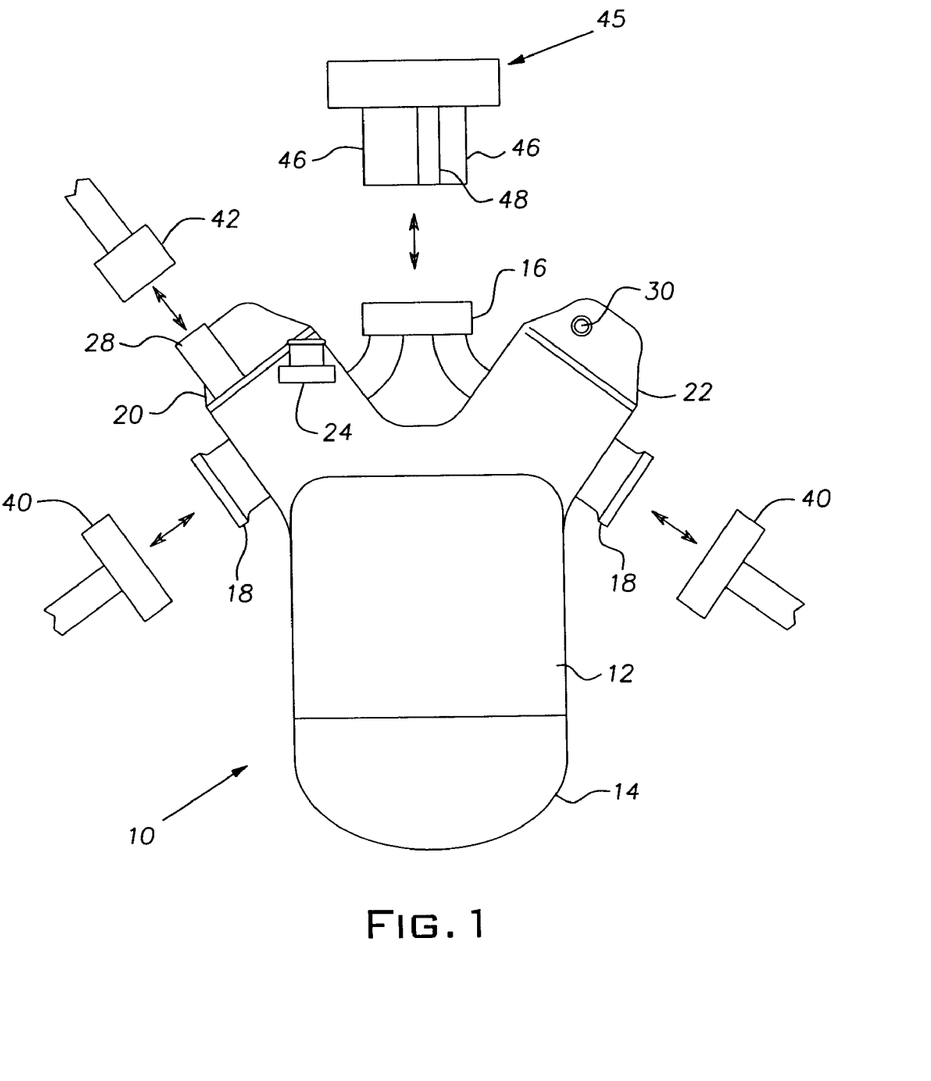
FIG. 1 is a schematic front view of an engine and a pressurizing apparatus.
Figure 2:
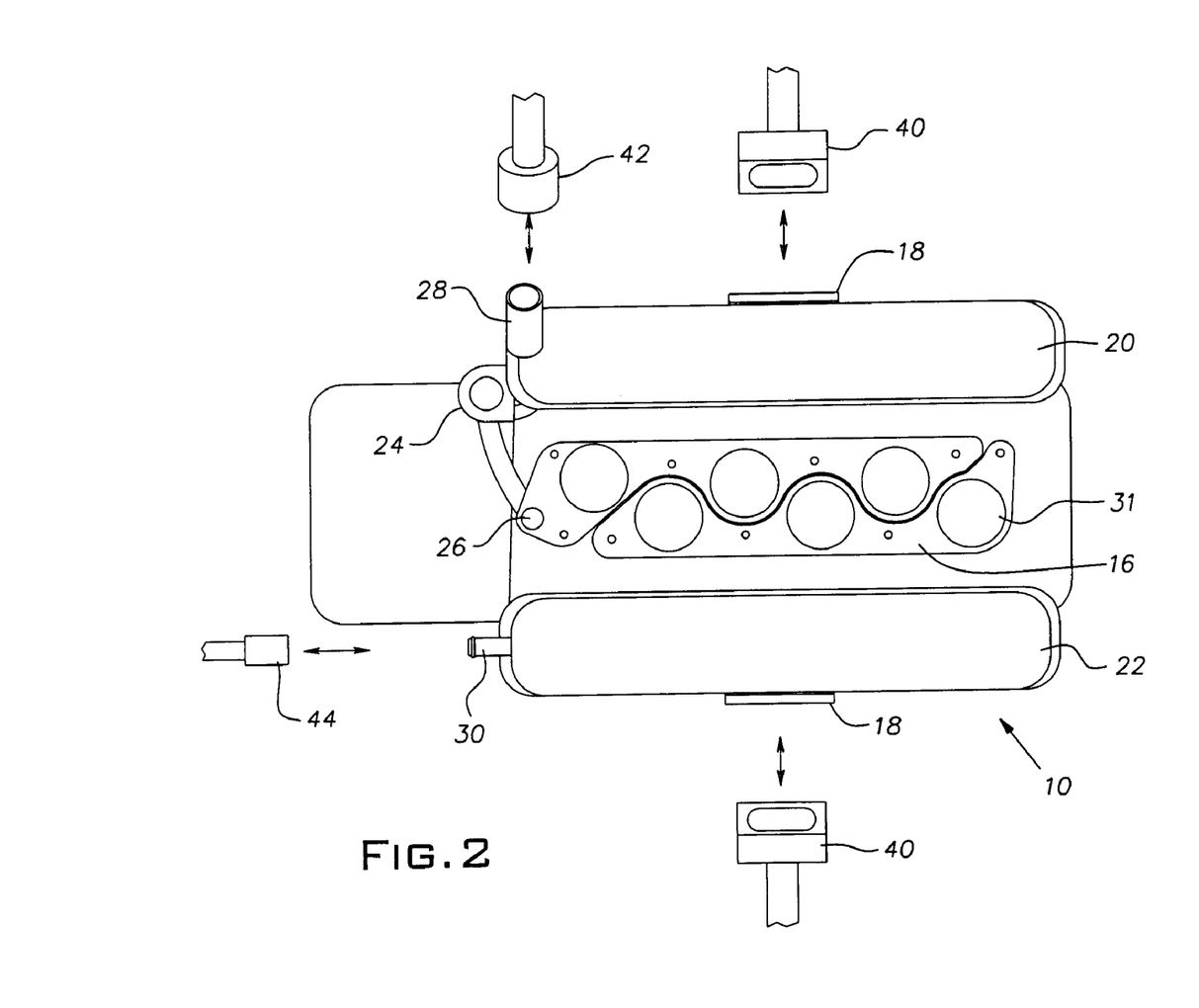
FIG. 2 is a schematic top plan view of the engine and portions of the pressurizing apparatus.
Figure 3:
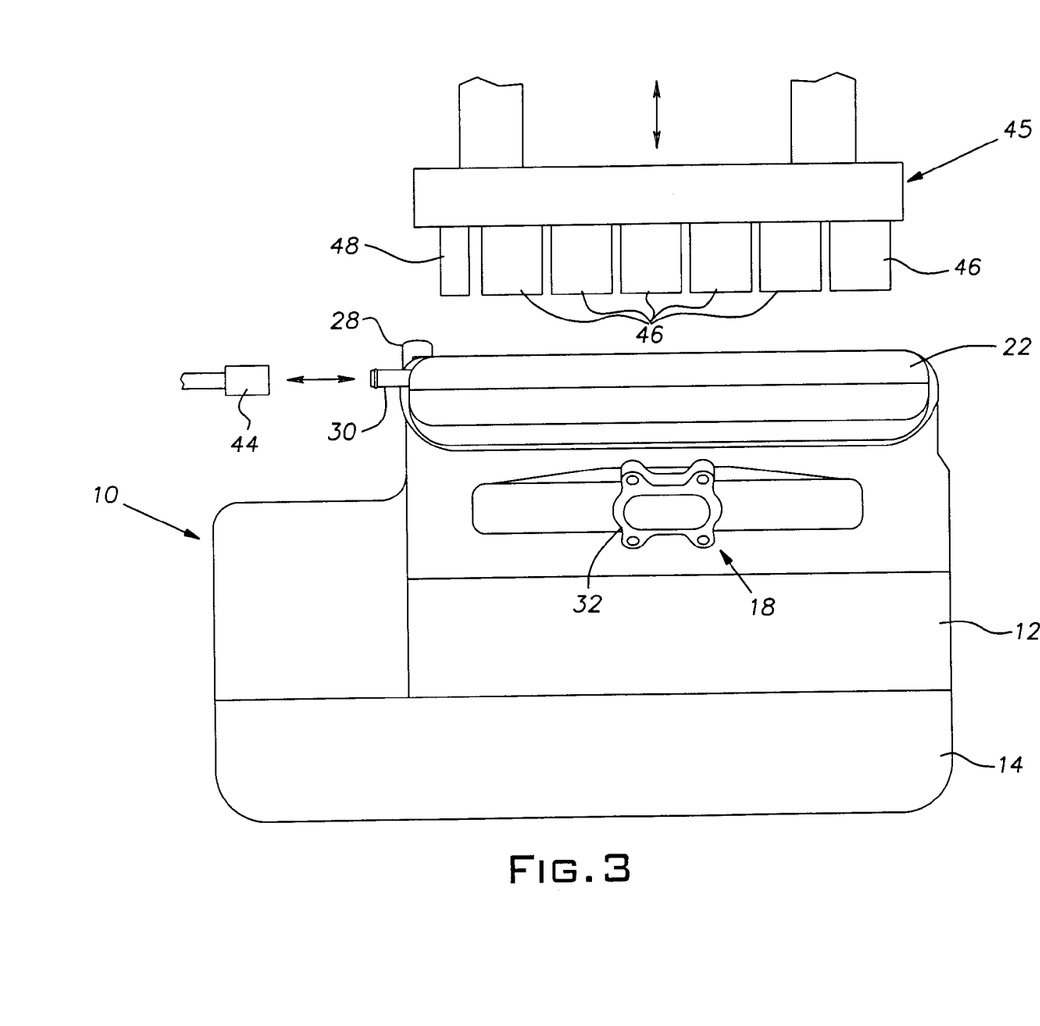
FIG. 3 is a schematic side view of the engine and portions of the pressurizing apparatus.

With reference to FIGS. 1-3, the engine 10 includes a cast engine block 12, a crankcase 14, an air intake base 16, a pair of exhaust manifolds 18, first and second head covers 20, 22, and an exhaust gas recirculation (EGR) valve 24.

The EGR valve 24 permits exhaust gas to be communicated from an exhaust of one or more of the engine cylinders back to an intake manifold (not shown) via the air intake base 16, so as to mix exhaust gas with incoming fresh combustion air and thereby improve engine efficiency. As such, the EGR valve 24 has an exhaust side that communicates with the exhaust of the engine 10, and an intake side that communicates with the intake manifold via an EGR port 26 formed on the top surface of the air intake base 16, as shown best in FIG. 2.

The first head cover 20 includes an oil fill tube 28 and the second head cover 22 includes a port 30, which is sometimes referred to as a breather port.

The air intake base 16 receives fresh combustion air and recirculated exhaust gases from the air intake manifold (not shown) and communicates a combustion air mixture to each of the cylinders. The air intake base 16 includes a series of air intake passageways 31, each of the passageways 31 being dedicated to a particular cylinder.

Each exhaust manifold 18 receives exhaust gases from cylinders on an associated side of the engine 10, and includes an exhaust port 32 that is connected to a vehicle exhaust system (not shown) and through which the exhaust gases flow.

It is noted that the engine 10 described to this point is relatively conventional and well known in the art, and that the engine structure forms no part of the present invention. It is further noted that the engine oil leak testing system and method of the present invention is not limited to the engine structure described herein, which is exemplary in nature. Rather, it is considered apparent that, with the principles described herein, one skilled in the art could easily adapt the system and method of the present invention to any engine design.

The engine 10 includes a series of oil seals that prevent engine oil, which is held in the crankcase 14 and distributed throughout the engine (i.e., oil system), from leaking out of the engine 10. These oil seals include one or more seals installed in the engine block 12 and the crankcase 14, and between the head covers 20, 22 and the engine block 12. The testing station tests the oil seals for leaks by pressurizing the engine 10 and monitoring the pressurized engine for air leaks indicative of a leak at one or more engine oil seals.

With continued reference to FIGS. 1-3, portions of a pressurizing apparatus provided by the testing station 100 are schematically illustrated in connection with the engine 10 that is to be tested. The pressurizing apparatus includes a series of pressure or pneumatic connectors that sealingly engage associated portions of the engine 10 and that are used to introduce pressurizing air into the engine 10 so as to pressurize the oil system and the intake and exhaust passages of the engine 10.

The pressure connectors are provided by a pair of exhaust manifold seal head units 40, an engine oil fill tube seal head unit 42, a head cover port seal head unit 44, an injector base seal head unit 45. As will be apparent from the following description, the injector base seal head unit 45 includes pressure connectors for the individual air passages 31 as well as for the EGR port 26. For purposes of clarity of description, the air passage pressure connectors will be referred to hereinafter as being provided by the air intake seal head unit 46 and the EGR port pressure connector will be referred to hereinafter as being provided by the EGR port seal head unit 48, although they are actually all disposed on the injector base seal head unit 45.

As will be appreciated, the exhaust manifold seal head units 40 are adapted to sealingly engage the exhaust manifolds 18; the engine oil fill tube seal head unit 42 is adapted to sealingly engage the oil fill tube 28; the head cover port seal head unit 44 is adapted to sealingly engage the head cover port (breather port) 30; the injector base seal head unit 46 is adapted to sealingly engage the air intake passageways 31 in the air intake base 16; and the EGR port seal head unit 48 is adapted to sealingly engage the EGR port 26 formed in the air intake base 16.

The seal head units 40, 42, 44, 45 are disposed on associated mechanisms, described hereinafter, so as to be movable toward and away from the engine 10. Accordingly, the seal head units 40, 42, 44, 45 are normally in a relatively retracted position between testing procedures and during a testing procedure are moved into an extended position in sealing engagement with associated portions of the engine 10. Shortly thereafter, pressurized air from a source of pressurized air is introduced via the seal head units 40, 42, 44, 46 into the engine 10.

More specifically, pressurized air is introduced into the engine 10 via the oil fill tube 28, the exhaust manifold ports 32, the air intake passageways 31, and the head cover port 30, which are hereafter collectively referred to as the engine pressurizing ports, and used to pressurize the engine 10. Pressurized air is also provided to the EGR valve 24 via the EGR port 26 and the EGR port seal head unit 48. As will be appreciated from the following description, pressurized air provided via the EGR port 26 is used to compensate or offset for leakage inherent in the EGR valve 24, and thereby eliminates the leaky EGR valve 24 as a source of error in the engine oil leak testing method.

Figure 4:
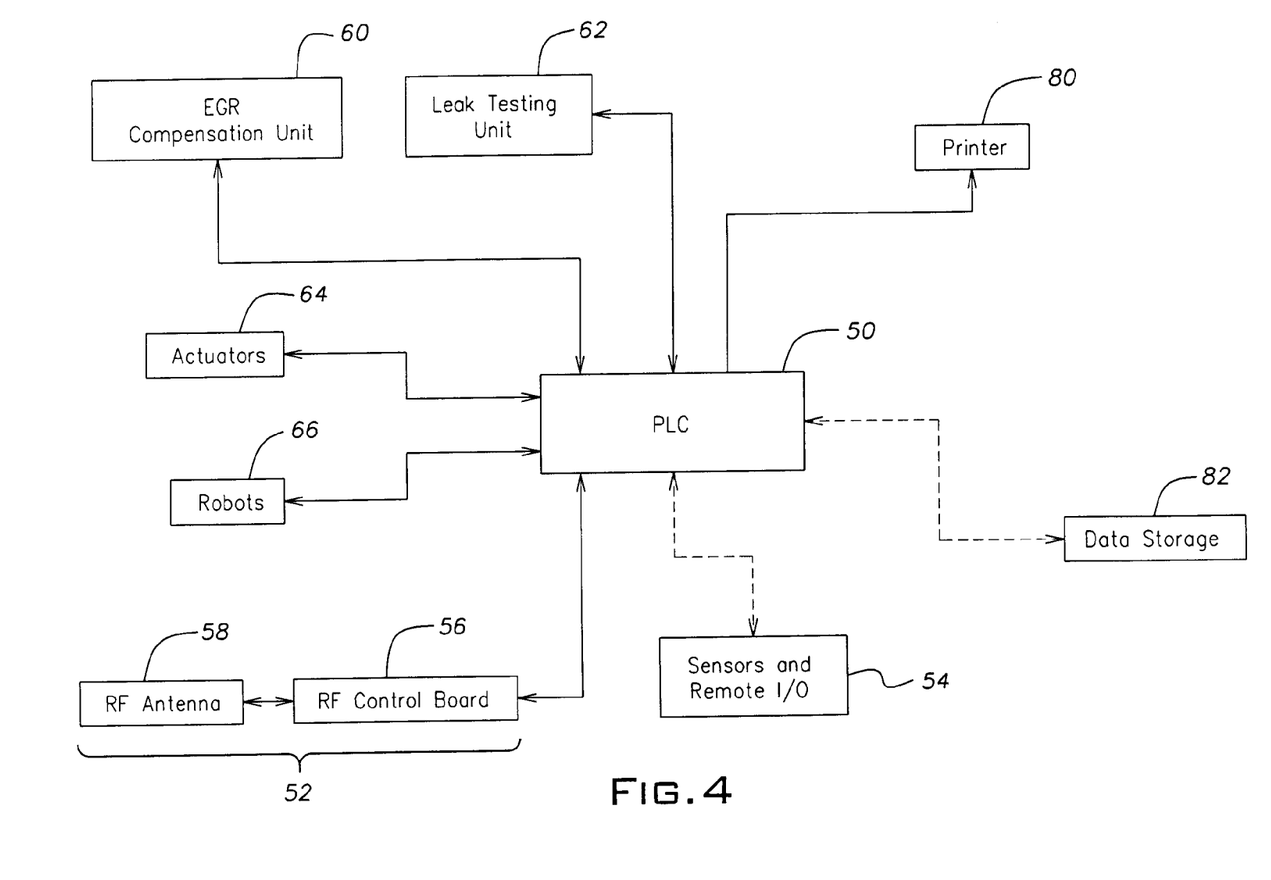
FIG. 4 is a schematic illustration of a control system for the leak testing station.

With reference to FIG. 4, a control system for the leak testing station 100 is schematically illustrated. The control system includes a programmable logic controller (PLC) 50, an RF reader 52, a series of sensors and remote input/output devices 54, an EGR compensation unit 60, a leak testing unit 62, actuators 64 and robots 66.

The RF reader 52 includes an RF control board 56 and RF antenna 58. The sensors 54 include a sensor for detecting the presence of a pallet/engine at the entrance of the testing station, a sensor for detecting the presence of a pallet/engine at a testing location within the testing station, and various sensors and interlocks for safe operation of the testing station.

The PLC 50 controls activation of the RF reader 52, receives information from the RF reader 52 (i.e., RF control board 56 and RF antenna 58) and the sensors 54, and initiates desired operating programs to control components of the testing station 100, such as the EGR compensation unit 60 and the leak testing unit 62, so as to automatically perform an engine oil leak testing procedure, as will be described hereinafter. The PLC program controls operation of the EGR compensation unit 60 and leak testing unit 62, as well as movable components of the testing station 100, such as actuators 64 for moving associated sealing head units (i.e., 42, 44, 45) into engagement with their corresponding engine ports, and robots 66 that carry sealing head units (i.e., 40) thereon.

Figure 5:
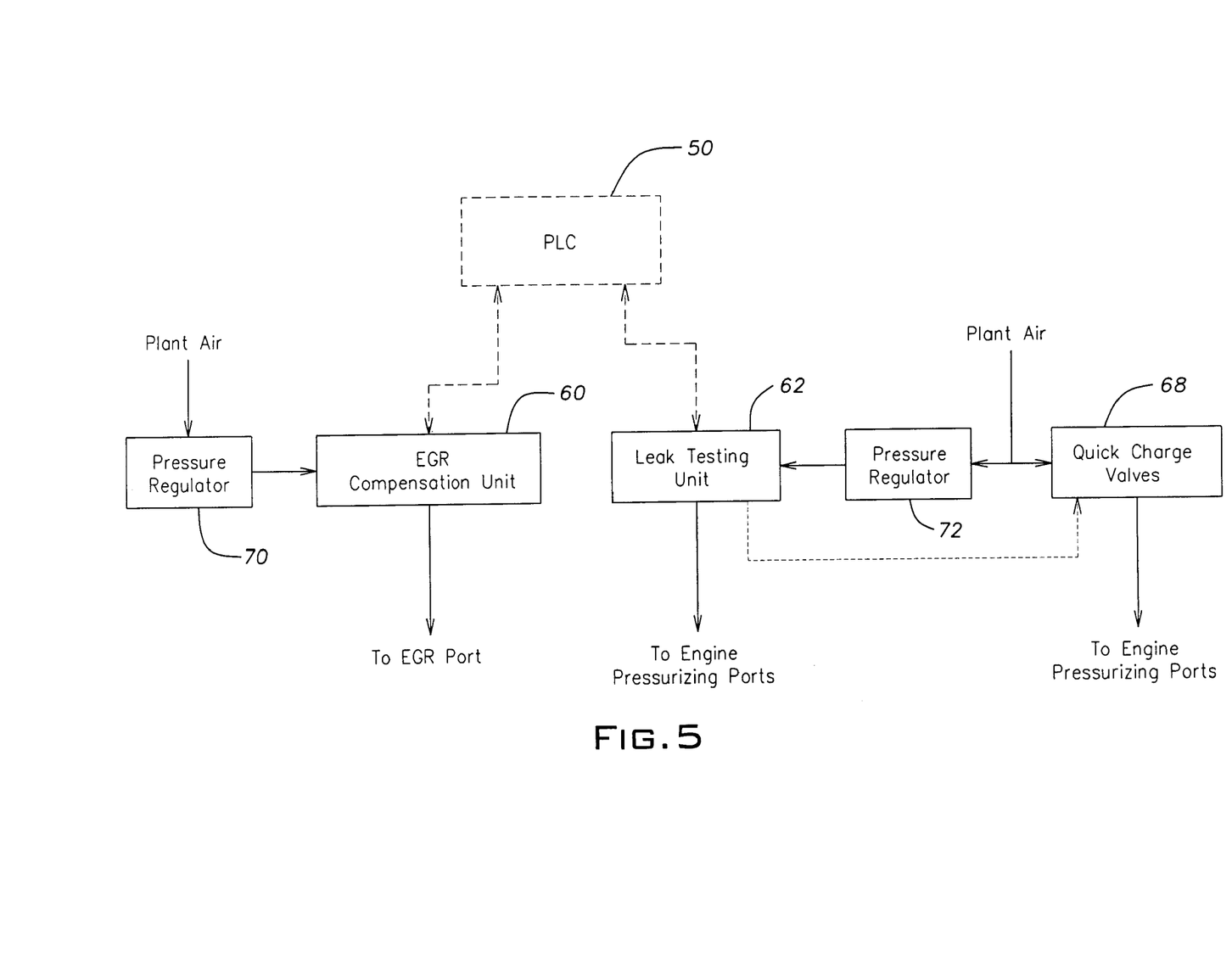
FIG. 5 is a schematic illustration of pneumatic connections for the leak testing station.

With reference to FIG. 5, a pneumatic system for the engine leak testing station is schematically illustrated. In addition to the previously described leak testing unit 62 and EGR compensation unit 60, the pneumatic system includes quick charge valves 68 and pressure regulators 70, 72. The quick charge valves 68 receive plant air and, under the control of the leak testing unit 62, output a high volume of air, at a predetermined reduced pressure, to the engine pressurizing ports for introduction into the engine 10.

Similarly, the leak testing unit 62 receives reduced pressure air from the pressure regulator 72, and supplies this reduced pressure air to the engine pressurizing ports. Preferably, the outputs of the quick charge valves 68 and the leak testing unit 62 are fluidly connected to the exhaust manifold seal head units 40, the engine oil fill tube seal head unit 42, the head cover port seal head unit 44, the air intake seal head unit 46 so as to provide pressurized air to the corresponding engine pressurizing ports. Further, the air supplied to the engine pressurizing ports via the quick charge valves 68 is at the same pressure as the air supplied to the engine pressurizing ports via the leak testing unit 62, with the quick charge valves 68 serving to quickly fill the engine 10 with pressurized air, and the leak testing unit 62 serving to subsequently monitor air leakage from the pressurized engine, as will be apparent from the following discussion.

Likewise, the EGR compensation unit 60 receives reduced pressure air from the pressure regulator 70 and supplies this reduced pressure air to the EGR intake port 26 via the EGR port seal head unit 48. The air supplied to the EGR intake port 26 via the EGR compensation unit 60 is at the same pressure as the air supplied to the engine pressurizing ports by the quick charge valves 68 and the leak testing unit 62, with the EGR compensation unit 60 serving to offset or compensate for leakage of air from the EGR valve 24 and thereby permit more accurate detecting of engine oil leaks, as will be discussed further hereinafter.

Figure 9:
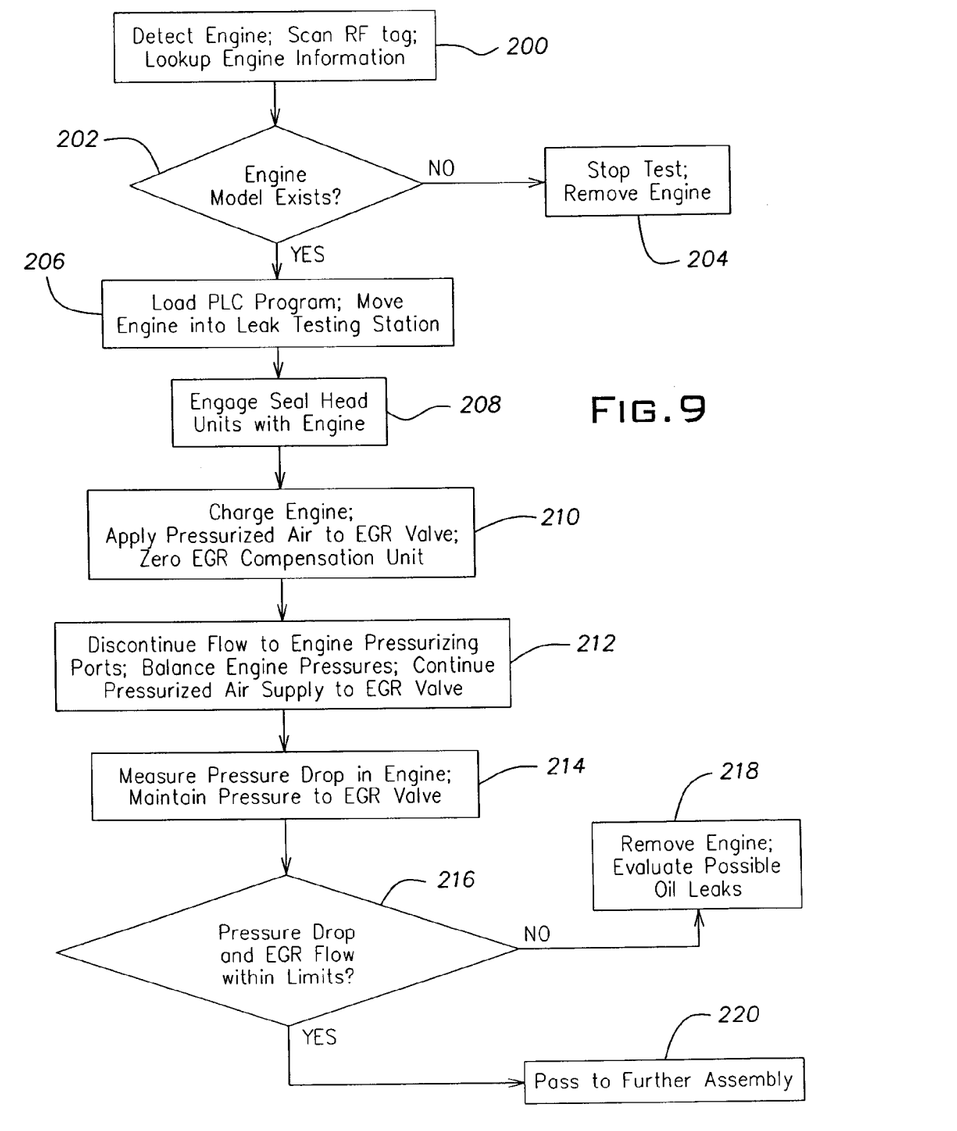

With reference to the drawings of FIG. 6-7, and the flow chart of FIG. 9, the leak testing station 100 is integrated or incorporated into the engine production line, and is fully automated. The engine 10 is disposed on the engine pallet 11, and moves with the assembly conveyor 102, which runs through the leak testing station 100. The pallet 11, with the engine 10 to be tested, arrive at an entrance of the testing station on the conveyor. When the engine 10 and pallet 11 are detected at the entrance of the testing station 100, the PLC program turns on an output to the RF control board 56 to start an engine pallet RF read cycle, which reads the engine's serial number from an RF data storage tag (not shown) located on the side of the pallet 11. The information on the RF tag is read by the RF antenna 58 and into the RF control board 56. The engine data is transferred to the PLC 50, and the PLC 50 decodes the engine model or type from the engine serial number (step 200). The PLC 50 compares the engine model type to information on a model lookup table stored in the PLC memory or elsewhere to confirm that the model type is valid (step 202). Should the model type not be present in the PLC lookup table, the PLC 50 turns on an alarm output indicating that the engine should be removed (step 204) and stops the automatic cycle. If the model type exists, the PLC 50 selects and loads a predetermined test program for that engine model type to control subsequent operation of the leak testing unit 62, the EGR compensation unit 60 as well as the robots 66 and actuators 64 (step 206).

For example, the predetermined test programs may vary between various model types by changing the predetermined time for charging the engine with pressurized fluid (to accommodate differences in the internal volume of the oil system between different engine models) and by changing the operation of the robots 66 to correctly seat the exhaust manifold seal head units 40 against the exhaust manifolds 18 (and to accommodate different exhaust manifold configurations—i.e., FIG. 8, described hereinafter). In this regard, it is considered apparent that other methods of indicating or inputting the engine model type may be employed, such as a bar code scanner or equivalent optical methods, or that the predetermined program may be a default program or a user-selected program should the assembly line handle only one or a limited number of engine models.

If the model number is valid (i.e., in the model lookup table), the PLC program releases the engine 10 and pallet 11 to move into the testing station 100. The engine 10 and pallet 11 move from the station entrance to a work location inside the test station 100. Once the engine is detected at the work location, the PLC program engages the pressure connectors or seal head units with the engine (step 208).

More specifically, the PLC program first advances the intake manifold seal head unit 45 onto the intake manifold (injector base 16) by activating the appropriate actuator 64. The EGR port opening 26 and the intake openings (ports) 31 on the injector base 16 are individually sealed by associated pressure connectors provided by the intake manifold seal head unit 45 upon actuation of the corresponding actuator 64. As noted previously, the air passage pressure connectors are pneumatically connected to each other by way of pneumatic circuits, which are preferably provided within the intake manifold seal head unit 45, while the EGR port pressure connector is fluidly isolated from the air passage pressure connectors. The oil fill opening seal head unit 42 advances to seal the oil fill opening 28 by actuation of the associated actuator 64. The PLC program then activates appropriate actuator 64 to advance the head cover port seal head unit 44 and seal the head cover port 30.

The PLC program then sends a robot cycle start signal to the exhaust manifold sealing robots 66. The robots simultaneously advance and move the exhaust manifold seal head units 40 into sealing engagement with the exhaust manifolds 18 (ports 32). At this point, all of the openings in the engine 10 where air could normally leak out to atmosphere are sealed, and the PLC program sends a start signal to the leak testing unit 62.

Thereafter, a charging step (step 210) is initiated, whereby the leak testing unit 62 activates the quick charge valve 68 to provide a large volume of air at a predetermined pressure to fill the engine 10 being leak tested in a short period of time. The output air lines of the quick charge valve 68 are connected to all of the seal head units for the engine pressurizing ports (i.e., exhaust manifold seal head unit 40, intake manifold seal head unit 46, oil fill opening seal head unit 42, and breather port seal head unit 44). This pneumatic configuration provides a quick and even pressurization of the engine oil system. The quick charge valve 68 remains on for a predetermined amount of time and then is turned off, while the leak testing unit 62 continues supplying air pressure during the charge cycle of the test to the engine 10 at a predetermined pressure and charge time.

At a predetermined time during the leak testing unit's charge cycle, the PLC program sends a start signal to the EGR compensation unit 60 to zero a mass air flow meter, which is inside the EGR compensation unit 60, at the flow rate of air leaking through the intake side of the EGR valve 24. The air supplied to the intake side of the EGR valve 24 is at an equal pressure, with large flow capacity, to the air supplied by the leak testing unit 62 to the EGR valve exhaust side by way of the engine 10 to which the valve 24 is connected.

After the EGR compensation unit 60 is zeroed, and once the leak testing unit 62 completes the charge cycle (i.e., after a predetermined amount of time), the leak testing unit 62 will cut off the supply of pressurized air to the engine via the engine pressurization ports, and will pause for a predetermined amount of time to allow the engine pneumatics to equalize or balance. During this time, pressurized air flow to the EGR valve 24 from the EGR compensation unit 60 is maintained (step 212).

After the balancing step, the leak testing unit 62 will monitor the pressure inside the engine for a predetermined period of time to detect any changes in the pressure of the air that has been trapped inside the engine (known hereinafter as the detect cycle). The change (drop) in air pressure during the detect cycle is compared to a predetermined alarm limit by the leak testing unit 62. If the air pressure change exceeds the predetermined alarm limit in the leak testing unit 62, the leak testing unit 62 sends an alarm signal to the PLC 50. At the same time (i.e., after the EGR compensation unit 60 receives the zero signal from the PLC 50), the air flow rate from the EGR compensation unit 60 is measured and monitored by the mass air flow meter and compared to predetermined upper and lower alarm limits (step 214). If the rate of air flow from the EGR compensation unit 60 exceeds the alarm limit during the test (after the zero function) an alarm output is sent to the PLC 50 from the EGR compensation unit 60. Specifically, air flow rates through the EGR compensation unit 60 above the alarm limits are consistent with a problem in the EGR valve 24, and warrant further inspection prior to passing the engine for further assembly.

The PLC 50 receives the test results from the EGR compensation unit 60 and the leak testing unit 62 (step 216). When a no-good test result occurs (i.e., when one of the alarm limits is exceeded), the PLC program returns the seal head units to their home positions by actuation of the robots 66 and actuators 64, and turns on a pallet repair pin set output to set a repair pin on the pallet 11 (indicating a no-good test occurred) (step 218). If the test results from EGR compensation unit 60 and the leak testing unit 62 do not exceed the predetermined alarm limits (i.e., test result is 'ok'), the PLC 50 returns all of the seal head units to their home position. When the test results are 'ok', the pallet repair pin is not set (step 220).

The PLC 50 retrieves the temporarily stored engine serial number (previously read from the pallet RF tag) and combines it with the test result data from the EGR compensation unit 60 and the leak test unit 62. The engine number and the test result data is then compiled by the PLC program into a predetermined format and transmitted to the printer 80 and to a data storage system 82 (FIG. 4). The engine is then released from the testing station 100, and the PLC program returns to its initial or start condition to prepare for receipt and testing of another engine.

It is believed apparent that the engine oil leak testing method and system of the present invention is capable of use with many different engine designs, and at different stages of the engine assembly. For example, FIG. 8 illustrates an alternative engine 10' to which an exhaust manifold extension 18a has been assembled prior to initiation of the leak testing procedure. Due to manufacturing considerations, it may be desirable to install such an extension 18a prior to the leak test. The illustrated extension includes an open port that is adapted to receive a sensor, such as an oxygen sensor. To prevent leakage of air from the open port, a modified exhaust manifold head seal unit 40a is provided, and includes a plug 40a' that fits into the open port and a pressure connection 40a" that sealing engages an open end of the extension 18a and through which pressurizing air is introduced into the exhaust manifold 18. With the method and system of the present invention, when an engine 10' having such an extension 18a is detected at the testing station entrance (i.e., via the RF tag/engine serial number), the robots 66 will preferably exchange the exhaust manifold seal head unit 40 for a modified exhaust manifold seal head unit 40a and the predetermined operating program will activate the robot 66 so as to properly position and seal the modified head unit 40a with the extension 18a, as described above.

Accordingly, the leak testing station and method described hereinbefore permits automated testing of partially manufactured engines for oil leaks. The entire testing procedure, from detection of the engine to release of the engine, only takes about 20-30 seconds. The actual pressurizing and testing steps (charging to leak detection) is performed in about 12-17 seconds. Accordingly, the leak testing station maybe incorporated into the production line, and the testing method may be performed on each engine without slowing the production line. Further, it is noted that the pressure developed within the engine is relatively low (i.e., about 0.20 kg/cm$^2$) so the time to charge the engine is relatively small, and the pressure developed on the oil seals is below the rated limits of such oil seals.

What is claimed is:

1. An engine oil leak testing station for testing an engine for possible oil leaks, said engine comprising an air intake base, an exhaust manifold, and exhaust gas recirculation (EGR) valve, and head covers including an oil fill tube and at least one port, said testing station comprising:
   a controller that is operable to initiate a testing sequence;
   sealing head units for, upon initiation of said testing sequence, sealing against associated portions of said engine and introducing pressurized air into said engine via one or more of said engine air intake base, exhaust manifold, oil fill tube and port;
   a leak testing unit that is operable to sense changes in pressure within said engine; and
   actuators associated with at least some of said sealing head units and operable, under the control of the controller, to move said at least some sealing head units into and out of sealing engagement with said associated engine portions.

2. The testing station of claim 1, further comprising at least one robot associated with at least one of said sealing head units and operable, under the control of the controller, to move said at least one sealing head unit into and out of sealing engagement with said associated engine portion.

3. The testing station of claim 1, further comprising a quick charge valve that is operable to introduce pressurized air into said engine via one or more of said engine air intake base, exhaust manifold, oil fill tube and port.

4. The testing station of claim 3, further comprising an EGR compensating unit that is operable to provide a flow of pressurized air to an intake side of said EGR valve so as to compensate for air leaking from said EGR valve.

5. The testing station of claim 4, further comprising actuators associated with at least some of said sealing head units and operable, under the control of the controller, to move said at least some sealing head units into and out of sealing engagement with said associated engine portions.

6. The testing station of claim 5, further comprising at least one robot associated with at least one of said sealing head units and operable, under the control of the controller, to move said at least one sealing head unit into and out of sealing engagement with said associated engine portion.

7. The testing station of claim 1, wherein said controller initiates a predetermined control program based upon a model type of said engine, and wherein said engine model type is automatically provided to said controller.

8. The testing station of claim 7, further comprising a means for sensing a model type of said engine, said controller using said engine model type to select a predetermined control program designed for said engine model type from a plurality of predetermined programs.

9. The testing station of claim 1, wherein said sealing head units introduce pressurized air via each of said engine air intake base, exhaust manifold, oil fill tube and port.

10. The testing station of claim 9, further comprising an EGR compensating unit and a quick charge valve, said EGR compensating unit being is operable to provide a flow of pressurized air to an intake side of said EGR valve so as to compensate for air leaking from said EGR valve, said quick charge valve being operable to introduce pressurized air into said engine via each of said engine air intake base, exhaust manifold, oil fill tube and port.

11. The testing station of claim 10, further comprising actuators associated with at least some of said sealing head units and operable, under the control of the controller, to move said at least some sealing head units into and out of sealing engagement with said associated engine portions.

12. The testing station of claim 11, further comprising at least one robot associated with at least one of said sealing head units and operable, under the control of the controller, to move said at least one sealing head unit into and out of sealing engagement with said associated engine portion.

13. An engine oil leak testing station for testing an engine for possible oil leaks, said engine comprising an air intake base, an exhaust manifold, and exhaust gas recirculation (EGR) valve, and head covers including an oil fill tube and at least one port, said testing station comprising:
 a controller that is operable to initiate a testing sequence;
 sealing head units for, upon initiation of said testing sequence, sealing against associated portions of said engine and introducing pressurized air into said engine via one or more of said engine air intake base, exhaust manifold, oil fill tube and port;
 a leak testing unit that is operable to sense changes in pressure within said engine; and
 an EGR compensating unit that is operable to provide a flow of pressurized air to an intake side of said EGR valve so as to compensate for air leaking from said EGR valve.

14. A method for testing an engine for possible oil leaks, said engine comprising an air intake base, an exhaust manifold, and exhaust gas recirculation (EGR) valve, and head covers including an oil fill tube and at least one port, said method comprising the steps of:
 selecting one control program from a plurality of control programs based upon a model type of the engine being tested;
 initiating the selected control program;
 sealingly connecting a seal head unit to each of said air intake base, exhaust manifold, oil fill tube, and port;
 pressurizing said engine by introducing pressurized air through at least one of said air intake base, exhaust manifold, oil fill tube, and port;
 after said engine is pressurized, monitoring said engine pressure for a predetermined period of time to detect a drop in engine pressure; and, using the detected drop in engine pressure to determine whether said engine may have a possible oil leak.

15. The method according to claim 14, further comprising the steps of:
 supplying pressurized air to an intake side of said EGR valve to compensate for air leaks in said EGR valve.

16. The method according to claim 15, comprising the further steps of:
 while monitoring the engine pressure, measuring a flow rate of pressurized air to said EGR valve intake side; and,
 using said measured flow rate to determine whether the EGR valve is functioning properly.

17. The method according to claim 14, wherein said selecting step includes the step of:
 determining the model type of said engine.

18. The method according to claim 17, wherein a model type is stored on a data storage device proximal to said engine, and wherein said engine model type is determined by accessing engine model type data from said data storage device.

* * * * *